Oct. 13, 1942.  A. WARMISHAM ET AL  2,298,992
OPTICAL MEASURING OR TESTING APPARATUS
Filed June 28, 1939  10 Sheets-Sheet 7

Inventors
A. WARMISHAM
AND
R.E. REASON
by
Blair & Kilcoyne
Attorneys

Patented Oct. 13, 1942

2,298,992

UNITED STATES PATENT OFFICE 2,298,992

OPTICAL MEASURING OR TESTING APPARATUS

Arthur Warmisham and Richard Edmund Reason, Leicester, England, assignors to Kapella Limited, Leicester, England, a company of Great Britain Application June 28, 1939, Serial No. 281,730
In Great Britain June 29, 1938

23 Claims. (Cl. 88—14)

This invention relates to optical measuring or testing apparatus, and has for its object to provide apparatus which can be employed for investigating projections of profiles of oblique or curved sections of shaped articles, for example for precision measurement of the effective axial cutting section of a helically relieved form milling cutter, or a hob or other cutting tool (rotatable relatively to the work) whose cutting edges are not located in planes containing the axis of rotation.

The apparatus according to the invention comprises an optical projecting device for projecting an image from an object surface on to an image surface, and means for imparting relative rotational movement about an axis (with or without further relative movement) to the article of which a profile is to be examined and to the optical projecting device (or a part thereof), whereby points of the profile are caused successively to pass through the object surface of the projecting device, so that an image of a projection of the profile on to the object surface is traced out on the image surface.

In the simple case of relative rotation alone, with the object surface constituted by a plane through the axis of rotation, the image traced out on the image plane will then correspond to the circumferential projection of the profile with respect to the axis. Such an arrangement can be employed for determining the axial cutting section of a form milling cutter or of a lathe tool having a helical cutting edge. If simultaneously with the relative rotational movement there is also a relative translational movement along the axis, an image of a helical projection of the profile will be traced out, as is required to determine the effective axial cutting section of a hob.

Means are preferably provided whereby in each position during the relative movement a strip or other portion of the object surface, including the point of intersection of the profile therewith, is selected for imaging on to the image surface. Such selection may be effected in various ways, usually involving a translational relative movement between parts of the apparatus in the direction of the axis of rotation, such movement being additional to the main relative rotational movement.

Thus the selecting means may comprise an illuminating device for directing a narrow strip of light on to the object surface, and means for imparting relative movement to the illuminating device (or part thereof) and to the article so correlated with the main relative movement as to maintain the point of intersection of the profile with the object surface within the illuminated strip. If the optical axes of the iluminating and projecting devices are substantially collinear, the image of each point of the profile will then be defined as the edge of the shadow on a strip of light, or more simply as the end of the strip. Alternatively, the selecting means may comprise a mask associated with the projecting device, and means for imparting relative movement to the mask and to the article, so correlated with the main relative movement as to maintain the point of intersection of the profile with the object surface within the strip or other portion of such surface selected by the mask for imaging.

The mechanism for ensuring proper correlation between the relative movements may include a stop cooperating with a cam shaped approximately to suit the profile, the stop and the cam being relatively movable in accordance with the selecting relative movement and acting to control the main rotational relative movement. The stop may be carried by the article and the cam by the selecting member which is movable relatively to the article, or alternatively the stop may be carried by the selecting member and the cam by the article. In the latter case the cam will comprise an approximate replica of the profile itself, and when (as will commonly be the case) the profile is formed by the edge of one of a series of similar teeth or projections angularly spaced around the article, the cam may be constituted by one of the other teeth or projections.

In some instances it will be desirable to provide means whereby the screen or photographic plate or other member constituting or carrying the image surface is movable relatively to the projecting device in proper correlation with the other relative movements in order to ensure that the images of points of the profile are located on the image surface in the correct relative positions.

For determining the effective axial cutting section of a hob, it will usually be desirable for the projecting device (and also the selecting means) to be angularly adjustable to suit the helix angle of the hob.

The invention may be carried into practice in various ways, but some convenient arrangements according thereto are illustrated by way of example in the accompanying drawings, in which—

Figure 2 is an end elevation of the arrangement of Figure 1, Figures 3 and 4 are views similar to those of Figures 1 and 2 of a modification thereof, Figure 9 is a horizontal section, Figure 10 a sectional end elevation and Figure 11 a front elevation of a practical construction generally analogous to the arrangement of Figures 7 and 8, Figures 12 and 13 illustrate a further alternative arrangement for a form milling cutter.

The arrangements of Figures 1–13 will for convenience be described with reference to their use in investigating the axial cutting section of a form milling cutter having a number of similar cutting edges (for example four) angularly spaced around it, with each edge lying in a plane or curved surface oblique to the axis of rotation, so that during rotation each cutting edge will intersect a fixed axial plane in a point which travels along the edge from end to end and generates in the plane a curve which is the circumferential projection of the edge and therefore corresponds to a plane section of the cut to be made by the cutter.

Figure 14:
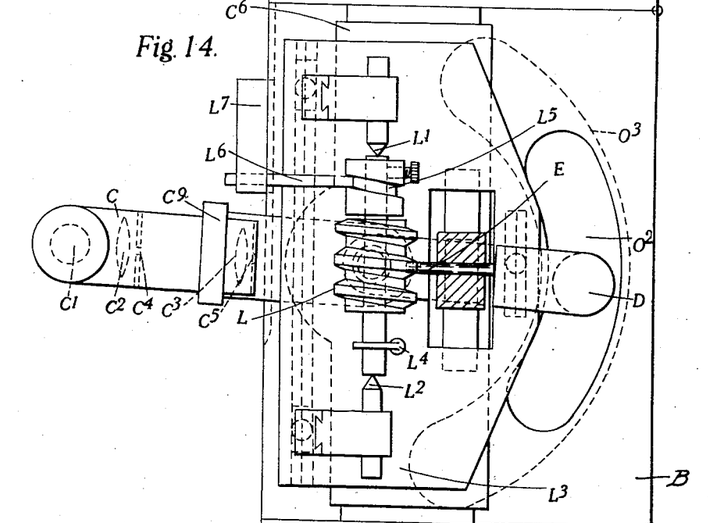
Figures 14 and 15 illustrate one convenient arrangement suitable for investigating a hob.
Figure 15:
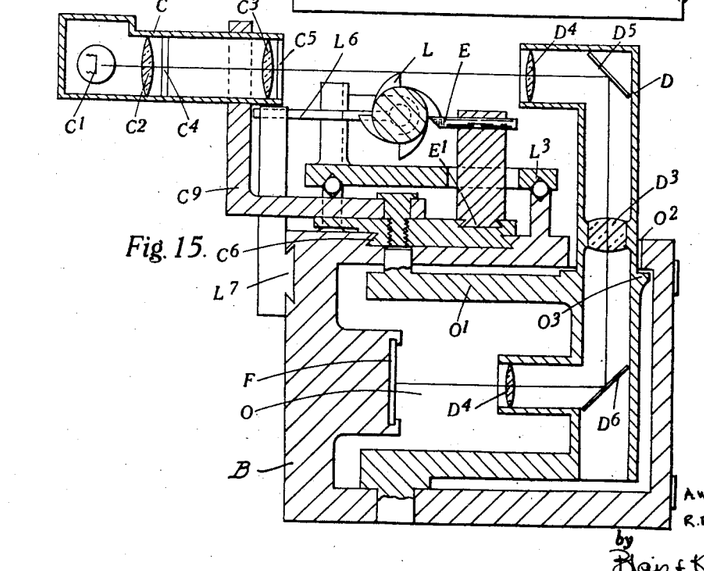

Figures 14 and 15 will be similarly described with reference to the investigation of the effective axial cutting section of a worm-cutting hob, there being in this instance a translational movement superimposed on the rotational movement so that a helical projection of the cutting edge will be generated on the fixed axial plane.

Figure 1:
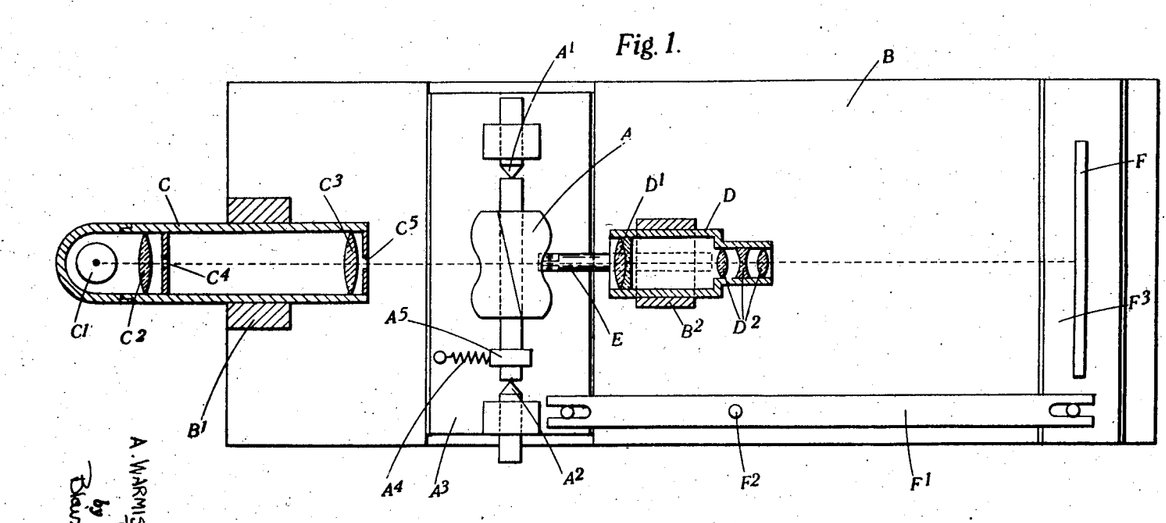
Figure 1 is a diagrammatic plan view of one arrangement suitable for investigating a form milling cutter.
Figure 2:
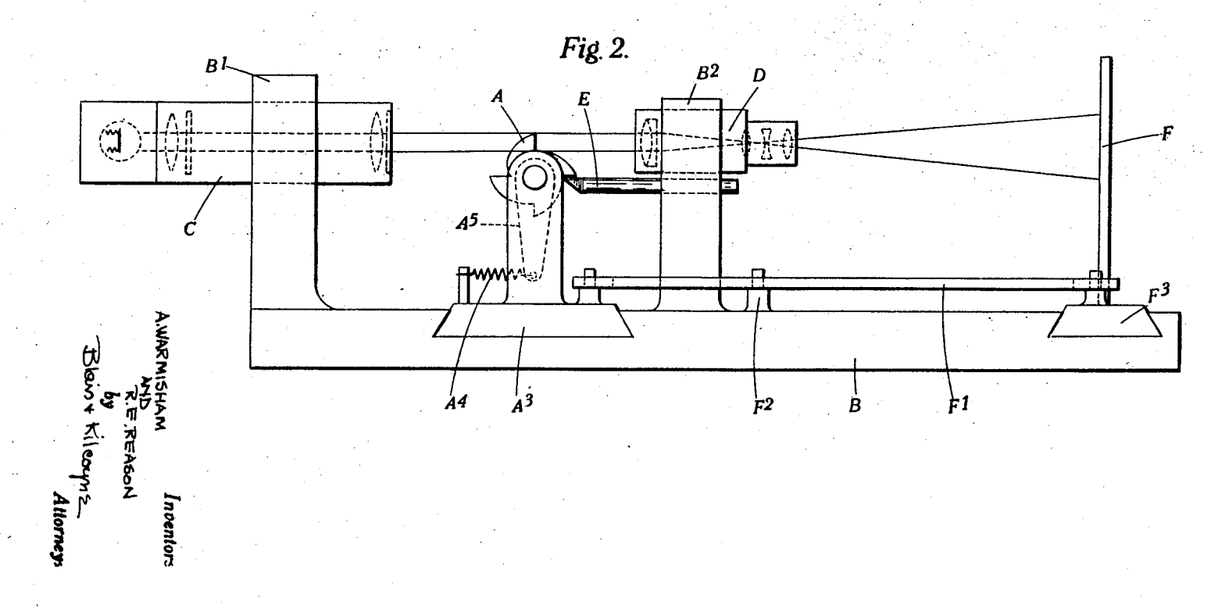

In the arrangement of Figures 1 and 2 the form milling cutter A is rotatably mounted on centres $A^1$ and $A^2$ carried by a slide $A^3$ movable across the fixed base B in a direction parallel to the axis of rotation of the cutter A. A spring $A^4$ acting through a lever $A^5$ on the cutter spindle tends to impart a rotational movement thereto. An illuminating device C carried on a fixed bracket $B^1$ and a projecting device D carried on a fixed bracket $B^2$ are mounted on opposite sides of the cutter A with coincident fixed optical axes perpendicular to a plane passing through the axis of the cutter, such plane constituting the object plane of the projecting device. It will be assumed, for convenience of description, that the cutter axis is horizontal and the object plane is the vertical plane containing such axis, the common optical axis being a horizontal line intersecting the object plane at a distance above the cutter axis corresponding approximately to the mean radius of the points on the cutting edges of the cutter.

The illuminating device C, in the example illustrated, consists of a source of light $C^1$ associated with a condenser $C^2$, an objective $C^3$, a narrow vertical slit $C^4$ close to the condenser and at the focus of the objective so that the rays emanating from the slit are collimated by the objective, and a second narrow slit $C^5$ between the objective and the cutter A, whereby a flat vertical sheet of collimated light is directed on to the cutter near its periphery.

A fixed stop E, which may consist of a knife edge (preferably slightly rounded to avoid cutting into the material of the cutter), is mounted on the bracket $B^2$, with its operative edge radial with respect to the cutter axis and lying in the vertical plane containing the optical axes of the illuminating and projecting devices in a position displaced from the object plane around the cutter axis by an angle equal to that subtended at the axis by corresponding points on any two cutting edges of the cutter (for example 90° from the object plane when the cutter has four edges as shown), so that when this stop abuts against a point on one cutting edge, the corresponding point on another cutting edge will lie in the object plane and in the illuminated vertical strip thereon. The shadow of the cutting edge will thus produce a sharply defined end to the illuminated narrow strip in the object plane, and the height of such end above a horizontal zero line in the object plane will be a measure of the depth of cut to be made by the particular point on the cutting edge. If the slide $A^3$ is moved across the base B, the spring $A^4$ will impart rotational movement to the cutter to the extent determined by the stop E, and the variations in the height of the end of the illuminated strip will correspond to variations in the depth of cut over a cross-section of the cut.

The optical projecting system D, which may be of any form but (as shown) comprises a collimating field lens $D^1$ and a three-element objective $D^2$, serves to project an image of the illuminated strip in the object plane on to a photographic plate F or projection screen in the image plane. Since the illuminated strip in the object plane remains stationary in position (although varying in length), it is necessary to impart a translational movement to the plate F in its own plane in order to separate the images of the various points on the cutting edge from one another and to ensure that they will be in their correct relative positions on the plate, such translational movement being dependent on the translational movement of the cutter and on the magnification ratio of the projecting system. If the projecting system gives an inverted image, the necessary movement of the plate can be obtained by a simple lever $F^1$ pivoted at $F^2$ to the base B and connecting the cutter slide $A^3$ to a slide $F^3$ which carries the plate F, the lever ratio corresponding to the magnification ratio of the projecting system. Thus by imparting a suitable slow, and preferably continuous, translational movement to the cutter slide $A^3$, a photograph will be obtained on the plate F comprising light and dark portions, the sharply defined separating edge between these portions defining the desired circumferential projection on an axial plane of the complete cutting edge and therefore also the cross-section of the cut to be made by the cutter.

Figure 3:
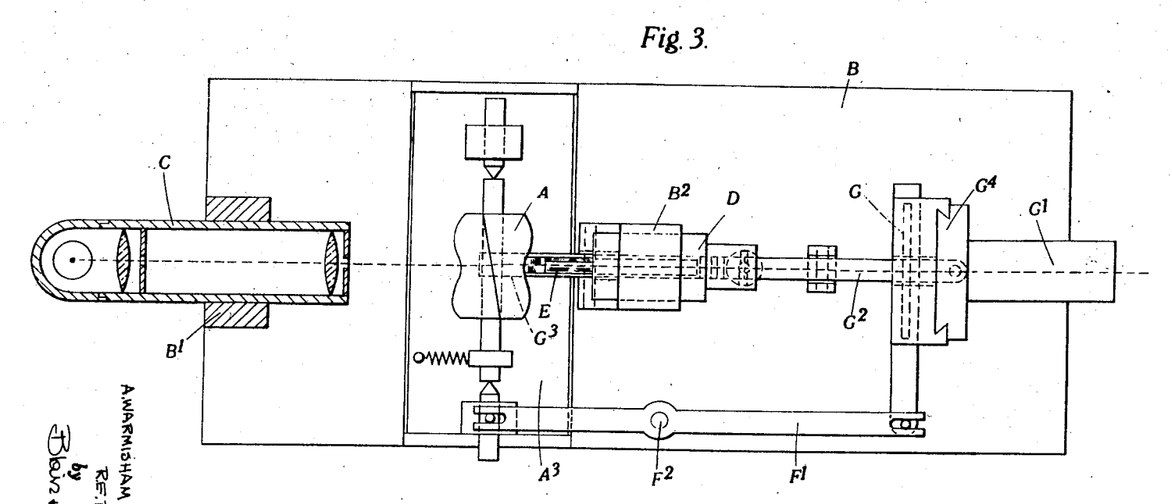
Figure 4:
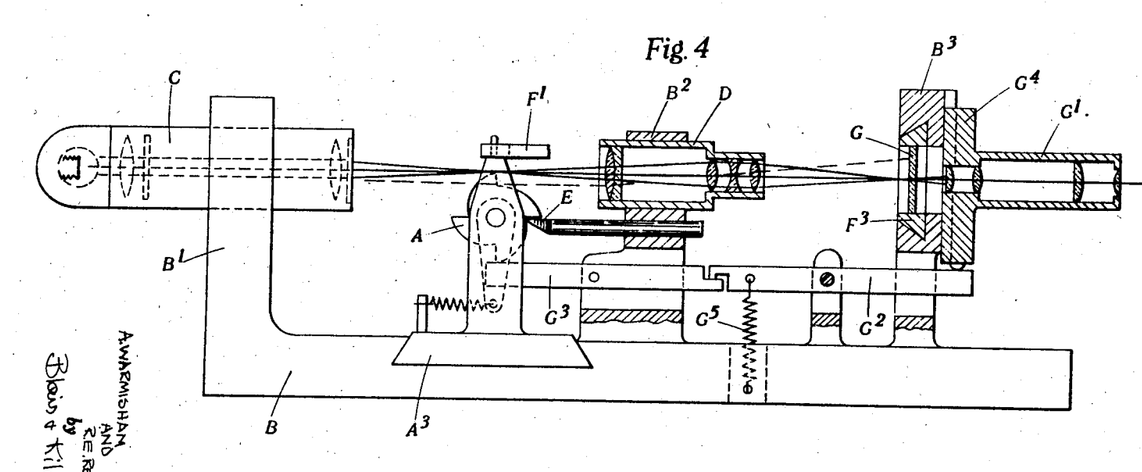

This arrangement may be modified, as shown in Figures 3 and 4, by the use of a graticule G in place of the photographic plate, whereby direct measurements can be made by visual observation of the graticule through a microscope $G^1$. Since, however, the field of view of a microscope is usually small, it is desirable to provide means for adjusting the height of the microscope to suit the varying height of the image strip, and this can be readily achieved by means of a pair of levers $G^2G^3$, one of which $G^2$ normally tends to raise a slide $G^4$ carrying the microscope under the action of a spring $G^5$, whilst the other engages with the periphery of the cutter A at one of its cutting edges and thereby limits the spring-controlled movement of the microscope in accordance with the varying heights of points on the cutting edge. The lever $F^1$ and slide $F^3$ are again provided as in Figures 1 and 2 for moving the graticule G to ensure correct relative location of the points of the image. The graticule may be provided with graduations for measurement purposes, and in some instances may bear a curve representative of the correct axial cutting section of the cutter for direct comparison with the image.

Figure 5:
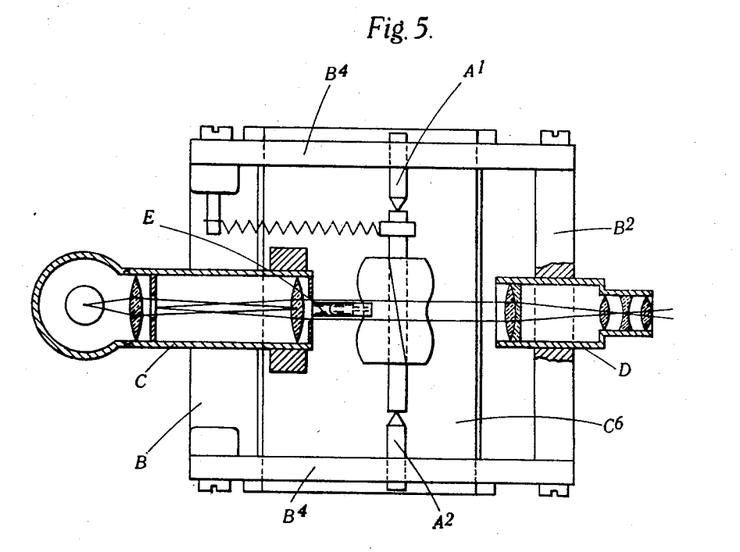
Figures 5 and 6 show a further modification of the arrangement of Figures 1 and 2, Figures 7 and 8 illustrate diagrammatically an alternative arrangement suitable for a form milling cutter.
Figure 6:
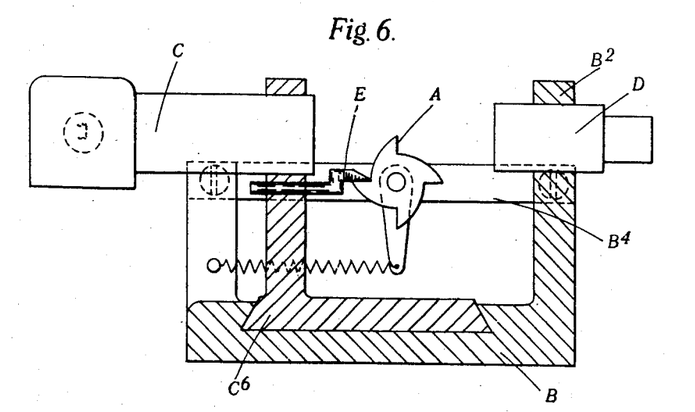

Figures 5 and 6 show a further modification of the arrangement of Figures 1 and 2, wherein the cutter A remains stationary (except for its rotational movement) and the illuminating device C is traversed past the cutter. For this purpose the illuminating device is carried by a slide $C^6$, movable parallel to the axis of rotation of the cutter, instead of by the bracket $B^1$, whilst the cutter centres $A^1A^2$ are supported on fixed crossbars $B^4$ suitably mounted on the base B. The stop E is also carried by the slide $C^6$ so as to be movable with the illuminating device. The projecting device D is again mounted on the fixed bracket $B^2$ and the extent of the cutting edge which can be imaged on the photographic plate (which is not shown, but which will be fixed to the base in the appropriate position) will therefore be limited by the field of view of the projecting device. The operation of this modification will be clear without further description.

Figure 7:
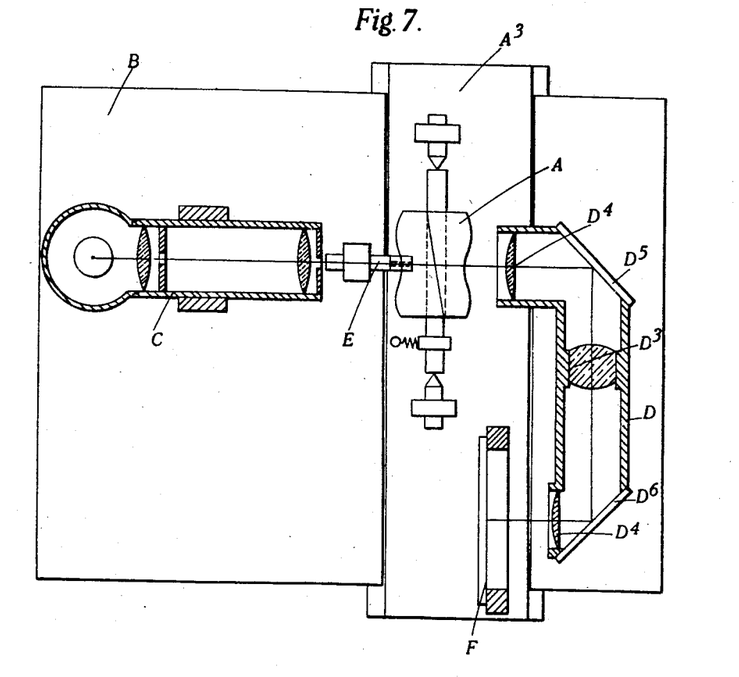
Figure 8:
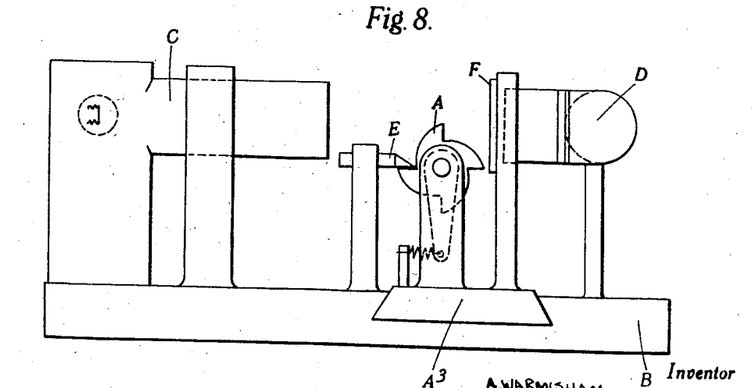

Figures 7 and 8 show an alternative arrangement of the projecting device by means of which the mechanism can be simplified. As in the arrangement of Figures 1 and 2, the cutter A is movable along its axis by means of the slide $A^3$, and the illuminating device C, the stop E and the projecting device D are all stationary. The projecting device D in this instance is arranged to give unit magnification and comprises a projecting lens $D^3$ disposed symmetrically between two collimating lenses $D^4$, with two inclined mirrors $D^5D^6$ interposed in the path of the rays whereby the optical axis is deflected through two right angles. It will often be possible to dispense with the collimating lens $D^4$ near the photographic plate, and in some instances (as mentioned later in connection with Figures 16–19) that nearer the cutter may be omitted. In this way the image plane is brought into coincidence with (or as shown close to and parallel to) the object plane, and the necessary translational movements of the cutter A and the photographic plate F will thus be equal and in the same direction. It is therefore possible to mount the photographic plate F directly on the slide $A^3$ carrying the cutter.

Figures 9, 10:
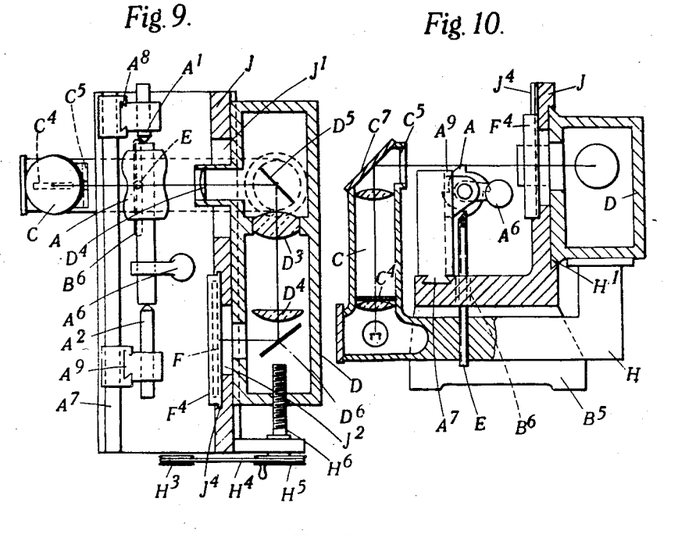
Figure 11:
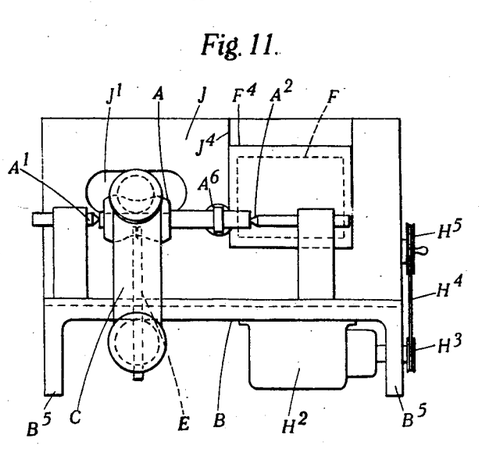

Figures 9–11 show a practical construction, which may be regarded as an inversion of the arrangement of Figures 7 and 8, the cutter A and plate F being stationary, whilst the illuminating device C, the stop E and the projecting device D are mounted to slide as a unit in a direction parallel to the axis of the cutter. These figures also serve to show certain practical constructional details, of which analogues are equally applicable to the other arrangements above described.

In this construction the base B is mounted on legs $B^5$, and the hollow space beneath the base B is utilised to accommodate a framework H carried by a slide $H^1$ engaging in a vertical bracket J on the base. This framework H carries the projecting device D, which is arranged in the manner shown in Figure 7, the illuminating device C, which is arranged in the manner shown in Figure 1 except for the addition of an inclined mirror $C^7$ to deflect the optical axis through a right angle, and also the stop E, which in this instance projects upwardly through a slot $B^6$ in the base B to engage with one of the cutting edges of the cutter A.

For driving the framework a motor $H^2$ drives through reduction gearing a pulley $H^3$ connected by a belt $H^4$ to a pulley $H^5$ attached to a driving screw $H^6$ which engages in the end of the projecting device casing. The framework H together with the parts it carries is thus driven slowly in the direction of the axis of the cutter A.

The cutter is held stationary during the investigation of its cutting edge, a weight $A^6$ being provided to effect the rotational drive against the stop E, but for the purpose of initial setting the centre $A^2$ is adjustable axially by means of the slide $A^7$ and the two centres $A^1A^2$ are adjustable vertically by means of the slides $A^8A^9$.

The vertical bracket J is provided with two slots $J^1J^2$ to permit the passage of the rays in all operative positions of the framework from the cutter A to the projecting device D and from the projecting device to the photographic plate F which is mounted in a plate holder $F^4$ vertically movable on guideways $J^4$ on the bracket J in front of the slot $J^2$.

Figure 12:
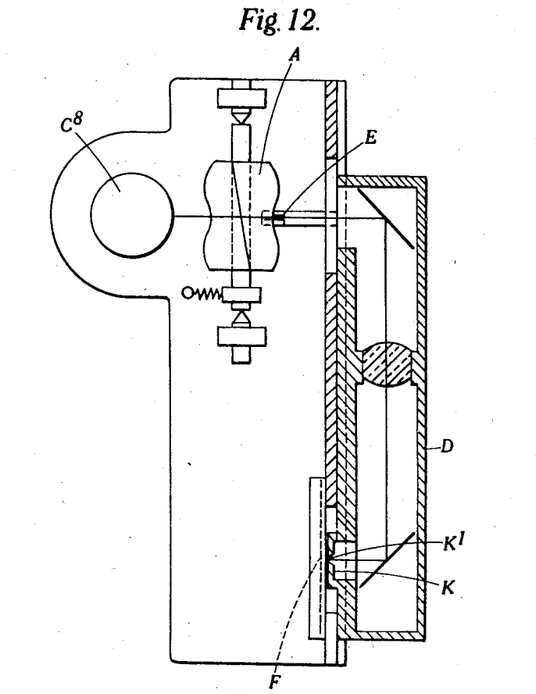
Figure 13:
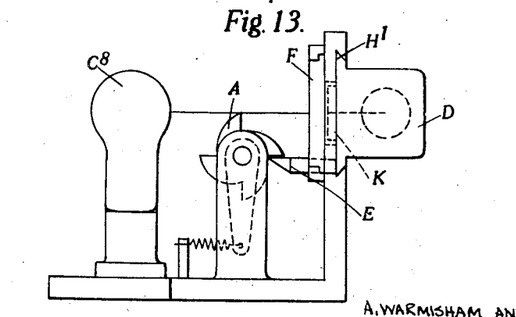

The use of a slit illuminator is avoided altogether in the arrangement shown in Figures 12 and 13. In this arrangement the cutter A is rotatable about its axis as before but is otherwise stationary, and the plate F is also stationary. The projecting device D (arranged as in Figures 7–11 except that in the example illustrated the two collimating lenses are omitted) is mounted on a slide $H^1$, as in Figures 9–11, and carries the stop E. The selection of the strip is here effected (instead of by a slit illuminator) by a mask K having a narrow vertical slit $K^1$. This mask is carried by the projecting device D and lies immediately next to the plate F. In order to provide sufficient light for the photograph, it may be desirable to provide an illuminator $C^8$, but it will be appreciated that the sole purpose of the illuminator is to increase the general illumination and that it serves no purpose towards selection as in the previous arrangements. The operation of this alternative will be clear without further description. The arrangement may be regarded as a modification of that of Figures 9–11, with the substitution of the slotted mask for the slit illuminator, and it will be clear that the other alternatives can be modified in an analogous way, the essential point being that the relative movement between the mask and the plate must be properly correlated with the relative movement between the stop and the cutter in accordance with the magnification ratio of the projecting device.

In all the foregoing arrangements the optical axis of the projecting device leaves the cutter A in a direction at right angles to the object plane, that is to the vertical plane through the cutter axis. In some instances, more especially for the investigation of the effective axial cutting section of a worm-cutting hob, it is desirable to arrange the projecting device obliquely. Thus in the case of a hob the axis of the projecting device (and likewise of the slit illuminator if provided) should preferably be swung round through an angle equal to the helix angle of the hob. One convenient arrangement of this kind is shown in Figures 14 and 15.

In this arrangement the hob L is mounted between centres $L^1$ $L^2$ on a slide $L^3$ movable axially along the fixed base B, a weight $L^4$ being provided to effect the rotational movement of the hob. In order to provide the necessary accompanying translational movement of the slide $L^3$, the hob is provided with a helical cam groove $L^5$, whose pitch is the same as that of the hob helix, and an arm $L^6$ (carried on a slide $L^7$ for initial adjustment purposes but held fixed during operation of the apparatus) engages in this groove, whereby the rotational and translational movements of the hob are so related that the hob will perform in space a true screwing movement and corresponding points along the hob helix will follow one another along the same path in space.

The movements of the hob are limited by a stop E engaging with one of the cutting edges of the hob (as shown an edge angularly spaced 90° away from the cutting edge under examination), and this stop is carried for initial adjustment purposes on a slide $E^1$ axially movable on a slide $C^6$ which carries the illuminating device C (arranged as in Figures 1 and 2). The stop E is arranged approximately radially with respect to the hob axis, but must be axially displaced from the transaxial plane through the point of intersection of the optical axis of the illuminating device with the vertical plane through the hob axis by a distance such that it will engage with the particular point on the cutting edge which corresponds to the said point of intersection on the cutting edge under investigation, since corresponding points on the various edges on the hob lie on a helical curve around the hob. Thus if, as shown, the stop engages with an edge spaced 90° away from the edge being investigated, the stop must be axially displaced by a distance equal to a quarter of the pitch of the helix. The adjustability of the stop E along the slide $C^6$ carrying the illuminating device thus enables the stop to be initially set in the proper position to suit the pitch of the particular hob under test. The illuminating device C is supported by an arm $C^9$ rotatable on the slide $C^6$ about a vertical axis through the point of intersection of the optical axis of the device with the vertical plane through the hob axis. This rotatability is again solely for initial adjustment purposes to enable the illuminating device to be swung round to suit the helix angle of the particular hob under test, the optical axis being set to be tangential to the hob helix at its point of intersection with the cutting edge.

The photographic plate F is located directly beneath the hob axis in a chamber O in the fixed base, the plate being fixed in position. A framework $O^1$ is journalled in the upper and lower walls of the chamber O, the axis lying vertically beneath the hob axis, and serves to carry the projecting device D, the arrangement being such as to give light-tight closure for the arcuate opening $O^2$ in the upper wall of the chamber O through which the optical projecting device passes. Thus the framework $O^1$ carries a shutter $O^3$ of sufficient size to cover the opening $O^2$ in all positions of the framework. The rotatability of the framework is for initial setting of the optical axis of the projecting device to suit the helix angle of the particular hob under test, this optical axis being parallel to that of the illuminating device. The field of view of the projecting device is made sufficient to cover the axial length of the part of the hob being tested, and the device is arranged generally in the manner described with reference to Figures 7 to 11 with a main projecting lens $D^3$, two collimating lenses $D^4$ and two inclined reflectors $D^5D^6$, the vertical plane through the hob axis constituting the object plane of the device and the photographic plate the image plane, the two planes being equally inclined to the optical axis. The projecting device is such that it will produce in the image plane a rectified image of the object plane free from distortion due to the oblique projection.

In operation, after the parts have been initially set to suit the helix angle and pitch of the hob, the slide $C^6$ carrying the illuminating device C and the stop E is traversed along the hob, the movement of the stop E permitting rotation of the hob with the attendant translational movement of the hob slide $L^3$. The points of one cutting edge of the hob are thus brought successively through the point of intersection of the optical axis of the illuminating device with the vertical plane. These points are thus imaged on the photographic plate in their correct relative positions, so that the image on the plate will represent the effective axial cutting section of the hob.

It will be appreciated that the arrangement of Figures 14 and 15 can be modified in various ways analogous to those above described for the milling cutter arrangements, the essential difference being that the main relative movement between the hob and the projecting device must consist of a combined rotational and translational movement suited to the helix angle of the hob, in contrast with the simple rotational movement suitable for the milling cutter (which can be regarded as the analogue of a hob with zero helix angle).

In the foregoing arrangements the illuminating device C has been described as having an illuminated slit $C^4$ at the focus of an objective $C^3$ so that collimated light cut off by a slit $C^5$ to form a flat vertical sheet of light is transmitted to the milling cutter or hob. The illuminating device may however be arranged in other ways, as shown for example in Figures 16 and 17, and in Figures 18 and 19.

Figure 16:
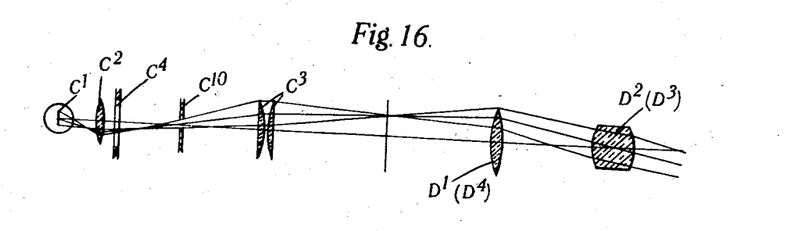
Figures 16 and 17 are optical diagrams illustrating an alternative arrangement of illuminating device.
Figure 17:
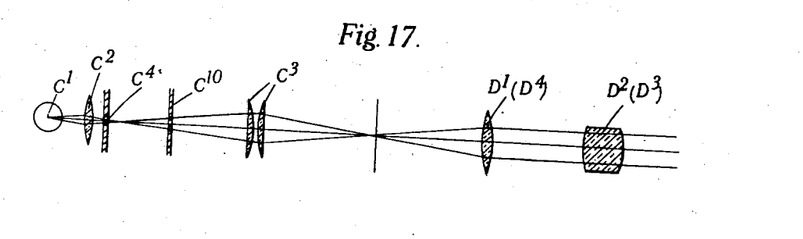
Figure 18:
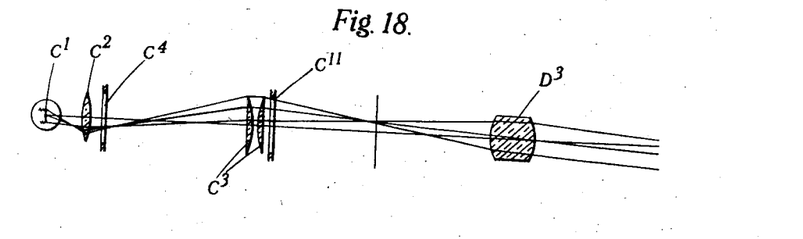
Figures 18 and 19 show a further alternative arrangement of illuminating device.
Figure 19:
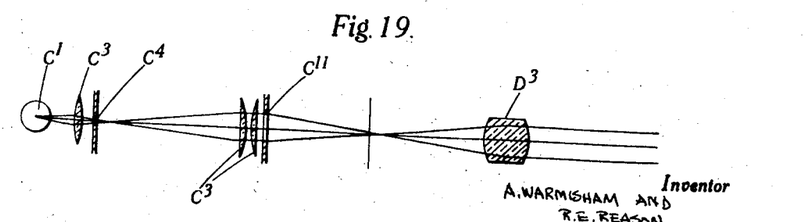

In the arrangement of Figures 16 and 17, the source $C^1$, the condenser $C^2$ and the slit $C^4$ are arranged as before, but in this instance the objective $C^3$ is so disposed as to focus the slit $C^4$ in the object plane of the projecting device, of which the projecting lens $D^2$ (or $D^3$) and the collimating lens $D^1$ (or $D^4$) are shown. In order to cut off unwanted light a stop $C^{10}$ is disposed at the focus of the objective $C^3$, this stop having a circular aperture. This arrangement can be employed when the projecting device is provided with the collimating lens $D^4$. When however such collimating lens is omitted, the arrangement of Figures 18 and 19 is preferably employed. In this arrangement the source $C^1$, the condenser $C^2$, the slit $C^4$ and the objective $C^3$ are arranged as in Figures 16 and 17, the objective focussing the slit $C^4$ in the object plane of the projecting device. The stop $C^{10}$ is however here replaced by a stop $C^{11}$ adjacent to the objective, this stop having a long narrow aperture with parallel sides and rounded ends, to cut off the unwanted light.

It will be appreciated that although the foregoing arrangements have been described more particularly with reference to the investigation of the effective axial cutting section of a milling cutter or hob, they are of general applicability, with appropriate modifications where necessary, to the investigation of circumferential or helical projections of profiles of rotary articles. The various arrangements may also be modified in ways other than those described within the scope of the invention.

What we claim as our invention and desire to secure by Letters Patent is:

1. Optical measuring or testing apparatus for investigating a projection of the profile of an oblique or curved section of a shaped article, comprising in combination a source of light, an optical projecting device for projecting an image from an object plane on to an image plane, means for imparting relative rotational movement about an axis to the article of which a profile is to be examined and to at least part of the optical projecting device whereby points of the profile are caused successively to pass through the object plane of the projecting device, a mask for intercepting part of the light passing from the source through the object plane and the projecting device to the image plane and thereby selecting only a portion of the object plane for imaging on to the image plane, such portion being small in comparison with the length of the profile, and means for imparting relative movement to the article and to the luminous ray path controlled by the mask so correlated with the main relative movement as to maintain the point of intersection of the profile with the object plane within the small portion of the object plane selected for imaging.

2. Optical measuring or testing apparatus for investigating a projection of the profile of an oblique or curved section of a shaped article, comprising in combination a source of light, an optical projecting device for projecting an image from an object plane on to an image plane, means for imparting relative rotational movement about an axis to the article of which a profile is to be examined and to at least part of the optical projecting device whereby points of the profile are caused successively to pass through the object plane of the projecting device, a mask located between the source of light and the object plane for intercepting part of the light passing from the source to the object plane and thereby selecting only a portion of the object plane for imaging on to the image plane, such portion being small in comparison with the length of the profile, and means for imparting relative movement to the mask and to the article so correlated with the main relative movement as to maintain the point of intersection of the profile with the object plane within the small portion of the object plane selected for imaging.

3. Optical measuring or testing apparatus for investigating a projection of the profile of an oblique or curved section of a shaped article, comprising in combination an optical projecting device for projecting an image from an object plane on to an image plane, means for imparting relative rotational movement about an axis to the article of which a profile is to be examined and to at least part of the optical projecting device whereby points of the profile are caused successively to pass through the object plane of the projecting device, a mask associated with the projecting device and acting to permit only a narrow strip of the object plane of width small in comparison with the length of the profile to be imaged on the image plane, and means for imparting relative movement to the mask and to the article so correlated with the main rotational movement as to maintain the point of intersection of the profile with the object plane within the narrow strip of such plane selected by the mask for imaging.

4. Optical measuring or testing apparatus for investigating a projection of the profile of an oblique or curved section of a shaped article, comprising in combination a support on which the article is rotatably mounted, means for imparting rotational movement to the article, an optical projecting device for projecting an image from an object plane containing the axis of rotation of the article on to an image plane, a mask associated with the projecting device and acting to permit only a narrow strip of the object plane of width small in comparison with the length of the profile to be imaged on the image plane, means for imparting relative translation movement in the direction of the axis of rotation to the article and to the mask, and means for for controlling the rotation of the article in accordance with such translational movement whereby the point of intersection of the profile with the object plane is maintained within the narrow strip of such plane selected by the mask for imaging.

5. Optical measuring or testing apparatus as claimed in claim 4, in which the optical axis of the projecting device intersects the object plane at right angles thereto, whereby the image traced out on the image plane during the movements represents the circumferential projection of the profile on a plane through the axis of rotation.

6. Optical measuring or testing apparatus as claimed in claim 4 in which the means for controlling the rotation of the article in accordance with the translation movement comprises a support for the mask, and two members respectively carried by the article and by the mask support, one of such members being constituted by a cam shaped approximately to suit the profile and the other a stop cooperating with the cam.

7. Optical measuring or testing apparatus for investigating the effective axial cutting section of a helically relieved form milling cutter, comprising in combination a suport on which the cutter is rotatably mounted, means for imparting rotational movement to the cutter whereby points of a cutting edge are caused successively to pass through a plane through the axis of rotation, a photographic plate, an optical projecting device for propecting an image from such axial plane on to the photographic plate the optical axis of the projecting device intersecting both the axial plane and the plate at right angles, a slotted mask disposed adjacent to the plate and acting to permit only a narrow strip of the said axial plane to be imaged on the plate such narrow strip containing the point of intersection of the cutting edge with the axial plane, a stop engaging with one of the cutting edges of the cutter and thereby limiting the rotational movement of the cutter, and means for moving the stop and the mask relatively to the cutter in a direction parallel to the axis of the cutter and thereby permitting the cutter to rotate so that an image of the effective axial cutting section of the cutter is traced out on the photographic plate.

8. Optical measuring or testing apparatus for investigating a projection of the profile of an oblique or curved section of a shaped article, comprising in combination an optical projecting device for projecting an image from an object plane on to an image plane, means for imparting relative rotational movement about an axis to the article of which a profile is to be examined and to at least part of the optical projecting device whereby points of the profile are caused successively to pass through the object plane of the projecting device, an illuminating device for directing on to the object plane a strip of light whose width is small in comparison with the length of the profile, means for imparting relative translational movement to the article and to at least part of the illuminating device, and means for controlling the main rotational movement in accordance with such translational movement whereby the point of intersection of the profile with the object plane is maintained within the illuminated strip thereon, the parts of the optical axes of the illuminating and projecting devices adjacent to the object plane being substantially parallel to one another so that the image of each point of the profile is defined as the edge of the shadow on a strip of light.

9. Optical measuring or testing apparatus as claimed in Claim 8, in which the means for controlling the main rotational movement in accordance with the translational movement comprises a support for the illuminating device and two members respectively carried by the article and by the illuminating device support, one of such members being constituted by guide shaped approximately to suit the profile and the other by a pin cooperating with the guide.

10. Optical measuring or testing apparatus for investigating a projection of the profile of an oblique or curved section of a shaped article, comprising in combination a support on which the article is rotatably mounted, means for imparting rotational movement to the article, an optical projecting device for projecting an image from an object plane containing the axis of rotation of the article on to an image plane, an illuminating device for illuminating a selected portion of the object plane the parts of the optical axes of the illuminating and projecting devices adjacent to the object plane being substantially parallel to one another, means for imparting relative translational movement in the direction of the axis of rotation to the article and to at least part of the illuminating device, a support for the illuminating device, a stop carried by the illuminating device support engaging with a surface on the article shaped to correspond to the profile thereon and thereby limiting the rotational movement of the article so that the point of intersection of the profile with the object plane is maintained within the selected illuminated portion thereof.

11. Optical measuring or testing apparatus for investigating the effective axial cutting section of a helically relieved form milling cutter, comprising in combination a support on which the cutter is rotatably mounted, means for imparting rotational movement to the cutter whereby points of a cutting edge are caused successively to pass through a plane through the axis of rotation, a photographic plate, an optical projecting device for projecting an image from such axial plane on to the photographic plate the optical axis of the projecting device intersecting both the axial plane and the plate at right angles, an illuminating device for directing a narrow strip of light on to the said axial plane the optical axis of the illuminating device being collinear with the cooperating part of the optical axis of the projecting device, a stop engaging with one of the cutting edges of the cutter and thereby limiting the rotation of the cutter, and means for moving the stop and the illuminating device relatively to the cutter in a direction parallel to the axis of the cutter and thereby permitting the cutter to rotate so that the point of intersection of the cutting edge with the axial plane is maintained within the illuminated strip on such plane and an image of the effective axial cutting section is traced out on the photographic plate.

12. Optical measuring or testing apparatus for investigating a projection of the profile of an oblique or curved section of a shaped article, comprising in combination a support on which the article is rotatably mounted, means for imparting rotational movement to the article, an optical projecting device for projecting an image from an object plane containing the axis of rotation of the article on to a plane image surface, a selecting device for selecting a portion of the object plane for imaging on to the image surface, means for imparting relative translational movement to the article support and to the selecting device in a direction parallel to the axis of rotation, means for correlating such translational movement and the rotational movement of the article to maintain the point of intersection of the profile and the object plane within the selected portion thereof, and means for moving the image surface of the projecting device relatively to the other parts of the projecting device in such correlation with the other relative movements as to ensure that the images of points of the profile obtained in successive positions are located on the image surface in the correct relative positions.

13. Optical measuring or testing apparatus for investigating a projection of the profile of an oblique or curved section of a shaped article, comprising in combination a support on which the article is rotatably mounted, means for imparting rotational movement to the article on such support, means for moving the support in the direction of the axis of rotation, a stationary optical projecting device for projecting an image from an object plane containing the axis of rotation on to a plane image surface, a carrier for the image surface of the projecting device movable relatively to the other parts of the device in a direction parallel to the said axis of rotation, a stationary illuminating device for directing a narrow strip of light on to the object plane of the projecting device the optical axis of the illuminating device being collinear with that of the projecting device, means for correlating the rotational movement of the article with the translational movement of its support whereby the point of intersection of the profile with the object plane of the projecting device is maintained within the illuminated strip thereon, and means for correlating the translational movements of the article support and the image surface carrier whereby the images of points of the profile obtained in successive positions of the article are located on the image surface in the correct relative positions.

14. In combination with the features set forth in claim 13, the carrier for the image surface being in the form of a graticule, of a microscope for viewing such graticule, and means responsive to the shape of the profile for so moving the microscope as to maintain the images of points of the profile within the field of view of the microscope.

15. Optical measuring or testing apparatus for investigating a projection of the profile of an oblique or curved section of a shaped article, comprising in combination an optical projecting device for projecting an image from an object plane into an image plane, a graticule in the image plane, a microscope for viewing such graticule, means for imparting relative rotational movement about an axis in the object plane of the projecting device to at least part of such device and to the article under investigation whereby points of the profile are caused successively to pass through the said object plane, and means responsive to the shape of the profile for so moving the microscope as to maintain the images of points of the profile within the field of view of the microscope.

16. Optical measuring or testing apparatus for investigating a projection of the profile of an oblique or curved section of a shaped article, comprising in combination a support on which the article is rotatably mounted, means for imparting rotational movement to the article, an optical projecting device for projecting an image from an object plane containing the axis of rotation of the article on to a plane image surface, a selecting device for selecting a portion of the object plane for imaging on to the image surface, means for imparting relative translational movement to the article support and to the selecting device in a direction parallel to the axis of rotation, means for correlating such translational movement and the rotational movement of the article to maintain the point of intersection of the profile and the object plane within the selected portion thereof, and means for mounting the image surface of the projecting device parallel to the object plane and directly on the support for the article, the projecting device being arranged to give unit magnification and including reflectors for deflecting the optical axis of the device through two right angles whereby the images of points of the profile obtained in successive positions are located on the image surface in the correct relative positions.

17. Optical measuring or testing apparatus for investigating a helical projection with respect to an axis of the profile of an oblique or curved section of a shaped article, comprising in combination, an optical projecting device including a reflectors deflecting the optical axis through two right angles for obliquely projecting a rectified image from an object plane containing the axis of the helix on to an image plane coincident with the object plane, means for imparting to the article a rotational movement about the helix axis and a translational movement along the axis the resultant helical movement corresponding to the helix of the projection under investigation, an illuminating device for directing a narrow strip of light on to the object plane around the point of intersection with such plane of the optical axis of the projecting device, means for imparting a translational movement to the illuminating device parallel to the axis of the article whereby the point of intersection of the profile with the object plane is maintained within the illuminated strip, and means whereby the projecting device and the illuminating device can be rotationally adjusted into a position in which their optical axes are inclined to the object plane at an angle equal to the complement of the helix angle.

18. Optical measuring or testing apparatus as claimed in claim 17, in which the means for imparting the rotational and translational movements to the article comprises a support for the article movable in the direction of the axis of the article, means for rotating the article on such support, a helical guide carried by the article so as to be rotatable therewith, and a stationary pin engaging with such guide whereby the support is traversed along the axis in proper correlation with the rotational movement.

19. Optical measuring or testing apparatus for investigating a helical projection with respect to an axis of the profile of an oblique or curved section of a shaped article, comprising in combination a support for the article, means for rotating the article about the said axis on such support, an optical projecting device for obliquely projecting an image from an object plane containing the said axis on to an image plane the optical axis of the projecting device being inclined to the object plane at an angle equal to the complement of the helix angle, means whereby the article and the projecting device can be moved relatively to one another in a direction parallel to the axis of the article, and means for correlating such relative translational movement with the rotation of the article to produce a relative screwing movement corresponding to the helix such means comprising two members respectively associated with the article and with the projecting device one of such members being constituted by a guide shaped in accordance with the helix and the other by a pin engaging with the guide.

20. Optical measuring or testing apparatus for investigating the effective axial cutting section of a worm-cutting hob having a plurality of cutting edges, comprising in combination an optical projecting device for obliquely projecting an image from an object plane containing the hob axis on to an image plane the optical axis of the device being inclined to the object plane at an angle equal to the complement of the helix angle of the hob, means for imparting to the hob and to the projecting device a relative rotational movement about the hob axis and a relative translational movement parallel to such axis such movements together constituting a relative helical movement corresponding to the hob helix, a selecting device for selecting a portion of the object plane for imaging on to the image plane, means for imparting a relative translational movement parallel to the hob axis to the hob and to the selecting device, and a stop associated with the selecting device and engaging with one of the cutting edges of the hob for correlating such relative translational movement with the main relative helical movement whereby the point of intersection of one of the cutting edges of the hob with the object plane will be maintained within the selected portion thereof.

21. Optical measuring or testing apparatus for investigating a helical projection with respect to an axis of the profile of an oblique or curved section of a shaped article, comprising in combination an oblique projecting device for projecting in a direction dependent on the helix angle an image from an object plane containing the axis of the helix on to an image plane, a selecting device for selecting for imaging on to the image plane a portion of the object plane small in comparison with the length of the profile, means for imparting to the article and to at least part of the projecting device two correlated relative movements whereby points of the profile are caused to pass successively through the object plane of the projecting device, such movements consisting of a rotational movement about the axis and a translational movement parallel to the axis and together constituting a relative screwing movement which in the neighbourhood of the point of intersection of the optical axis of the projecting device with the object plane corresponds to the helix of the desired projection, and means for imparting to the selecting device and to the article a relative translational movement so related to the other relative movements that the point of intersection of the profile with the object plane is maintained at every instant within the selected small portion of the object plane, whereby an image of the desired helical projection is traced out on the image plane.

22. Optical measuring or testing apparatus as claimed in claim 21, in which the selecting device comprises an illuminating device for directing on to the object plane a strip of light which contains the point of intersection of the profile with the object plane and whose width is small in comparison with the length of the profile, the parts of the optical axes of the illuminating and projecting devices adjacent to the object plane being inclined at the same angle to the object plane.

23. Optical measuring or testing apparatus for investigating a helical projection with respect to an axis of the profile of an oblique or curved section of a shaped article, comprising in combination an oblique projecting device for projecting in a direction dependent on the helix angle an image from an object plane containing the axis of the helix on to an image plane, means for imparting to the article and to at least part of the projecting device two correlated relative movements whereby points of the profile are caused to pass successively through the object plane of the projecting device, such movements consisting of a rotational movement about the axis and a translational movement parallel to the axis and together constituting a relative screwing movement which in the neighbourhood of the point of intersection of the optical axis of the projecting device with the object plane corresponds to the helix of the desired projection, and means whereby the projecting device can be rotated about an axis in the object plane perpendicular to the axis of the helix so that the direction of image projection can be adjusted to suit different helix angles, the projecting device being arranged to give unit magnification and including reflectors for deflecting its optical axis through two right angles in a plane containing the axis of rotation of the projecting device whereby the points of intersection of such optical axis with the object and image planes lie in the axis of rotation of the projecting device.

ARTHUR WARMISHAM.
RICHARD EDMUND REASON.